United States Patent [19]

Stevens, Jr.

[11] 3,843,172

[45] Oct. 22, 1974

[54] KEG TAPPING DEVICE HAVING IMPROVED SEALING MEANS

[75] Inventor: Frederick F. Stevens, Jr., Fairfield, Conn.

[73] Assignee: Hoff-Stevens, Inc., Ansonia, Conn.

[22] Filed: Sept. 26, 1973

[21] Appl. No.: 401,026

[52] U.S. Cl............ 285/137 R, 137/322, 137/594, 251/DIG. 1, 285/354, 285/DIG. 11, 285/38, 285/331
[51] Int. Cl............................................. F16l 39/00
[58] Field of Search............ 285/25, 38, 26, 28, 29, 285/331, 137 R, DIG. 11, 354; 137/594, 322; 251/DIG. 1; 277/180

[56] References Cited
UNITED STATES PATENTS

| 2,786,417 | 3/1957 | Lung | 285/137 R X |
| 3,228,413 | 1/1966 | Stevens | 137/594 X |

FOREIGN PATENTS OR APPLICATIONS

| 957,909 | 5/1964 | Great Britain | 285/137 R |
| 1,286,052 | 1/1962 | France | 277/180 |

Primary Examiner—Dave W. Arola
Attorney, Agent, or Firm—McCormick, Paulding & Huber

[57] ABSTRACT

A tapping device for beer kegs or the like includes a keg unit permanently or semi-permanently mounted on a keg and having a pair of passageways therethrough for receiving a pair of tubular probes associated with a tavern unit which is connected to the keg unit at a tavern or restaurant where beer is dispensed. The device includes a unitary elastomeric seal member carried by the tavern unit and surrounding the probes thereon. The seal member provides a gas and liquid tight seal between the tavern and the keg units when the two units are assembled in connected relation. Means is provided to limit compressive force applied to the seal member by connection of the units so that it retains its sealing integrity even after prolonged usage involving repeated connection and disconnection.

8 Claims, 7 Drawing Figures

PATENTED OCT 22 1974　　3,843,172
FIG. 1
FIG. 2
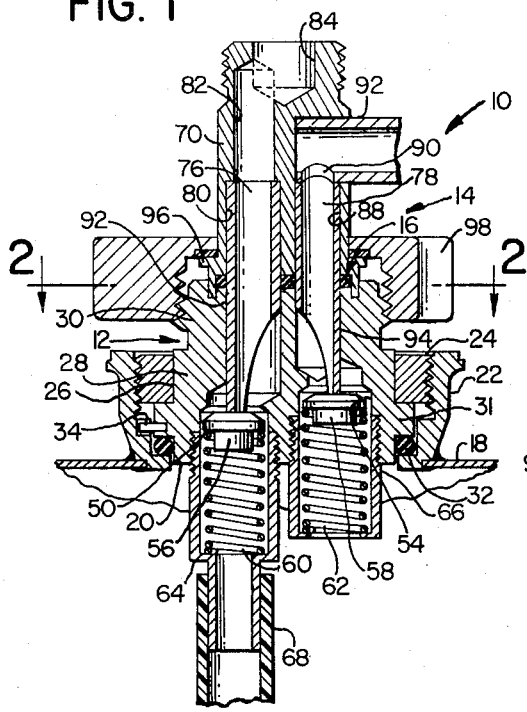
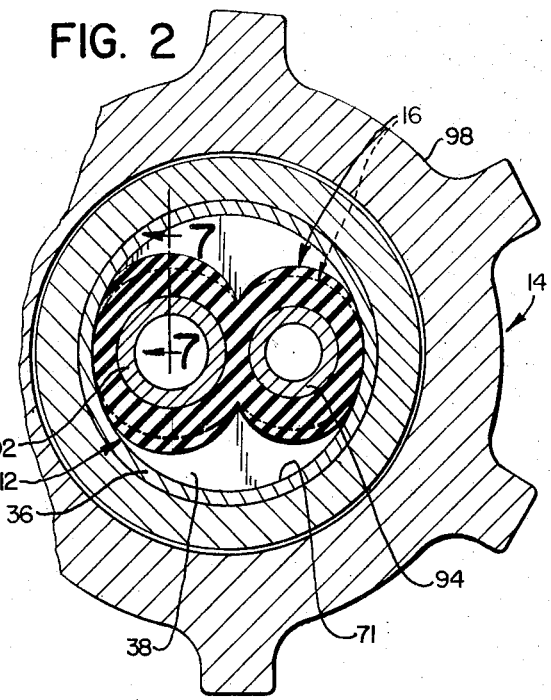
FIG. 3
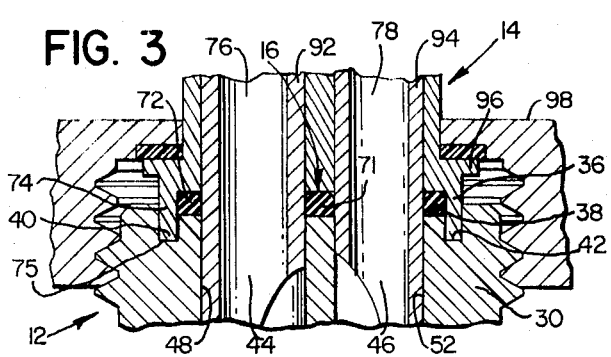
FIG. 5
FIG. 4
FIG. 6
FIG. 7
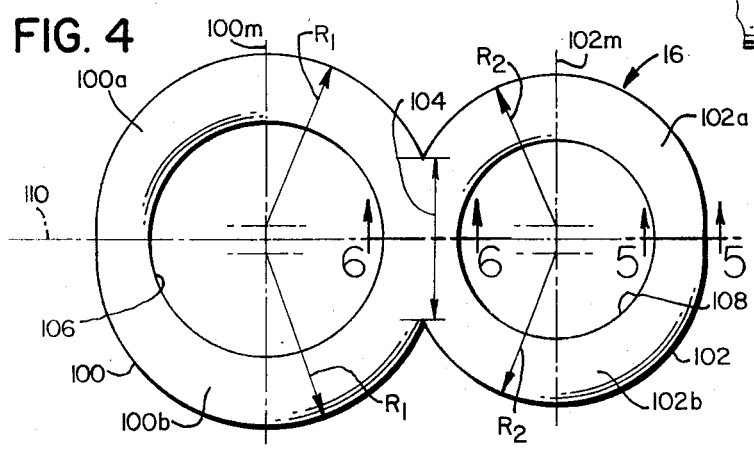
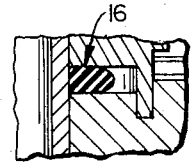

KEG TAPPING DEVICE HAVING IMPROVED SEALING MEANS

BACKGROUND OF THE INVENTION

This invention relates to a tapping device for dispensing fluid such as beer from containers such as kegs or barrels, using gas under pressure to drive the fluid from the container, and deals more particularly with a tapping device which includes a keg unit and a tavern unit adapted for connection to the keg unit. In a tapping apparatus of the afore-described general type usually the keg unit is adapted to be permanently or at least semipermanently attached to a keg to remain with the keg through a number of fillings and emptyings thereof. The tavern unit is adapted to be attached to the cooling and drawing equipment at a tavern or restaurant and remains there for connection to and disconnection from a supply of barrels or kegs, as required, to provide a constant supply of beer. Each time the tavern unit is connected to an associated keg unit a substantially gas and liquid tight seal must be established between the two units to assure efficient beverage transfer without leakage of the beverage or the gas used to dispense it. A seal member is customarily provided for sealing engagement between the two units when the units are connected in operative relation. The importance of maintaining sealing integrity between the units after repeated connection and disconnection is self-evident.

The general aim of the present invention is to provide a tapping device of the aforedescribed general type which includes an improved sealing member for assuring gas and liquid tight sealing integrity between keg and tavern units which comprise the device even after prolonged usage and repeated connection and disconnection of associated units.

SUMMARY OF THE INVENTION

In accordance with the present invention, a keg tapping device is provided which includes a first unit adapted to be mounted in the tapping opening of a keg, a second unit movable between connected and disconnected positions relative to the first unit and having a pair of tubular probes projecting in side-by-side relation therefrom for insertion into passageways in the first unit when the second unit is in its connected position relative to the first unit, and a unitary elastomeric seal member having a generally figure-eight shaped configuration and assembled with one of the units in engagement with a bearing surface thereon. When the second unit is in its connected position, the sealing member surrounds each of the probes and is disposed in sealing engagement with the bearing surface on the one unit and with another bearing surface on the other unit. Means is provided to limit application of compressive force to the seal member when the two units are connected to prevent the elastomeric seal member from taking a permanent set whereby its sealing integrity may be impaired.

BRIEF DESCRIPTION OF THE DRAWING

FIG. 1 is a vertical sectional view taken through a tapping device embodying the present invention.

FIG. 2 is a somewhat enlarged sectional view taken generally along the line 2—2 of FIG. 1.

FIG. 3 is a somewhat enlarged and fragmentary vertical sectional view of the device of FIG. 1.

FIG. 4 is a somewhat enlarged plan view of the seal member of FIG. 1.

FIG. 5 is a fragmentary sectional view taken along the line 5—5 of FIG. 4.

FIG. 6 is a fragmentary sectional view taken along the line 6—6 of FIG. 4.

FIG. 7 is a fragmentary sectional view taken along the line 7—7 of FIG. 2.

DETAILED DESCRIPTION OF THE PREFERRED EMBODIMENT

Turning now to the drawing, and first considering FIGS. 1, 2 and 3, a keg tapping device embodying the present invention and indicated generally at 10 comprises a first unit, indicated generally at 12 and referred to as a keg unit and a second unit or tavern unit indicated generally at 14. The tavern unit is movable between connected and disconnected positions relative to the keg unit. When the tavern unit 14 is connected to the keg unit 12 an elastomeric seal member, designated generally by the numeral 16 and carried by one of the units, provides a gas and liquid tight seal between the two units.

The keg unit 12 is adapted to be permanently or semipermanently secured in a tapping opening of a keg or other container of the type conventionally used to store and ship beer or other liquids under pressure. The keg unit 12 of the present invention remains with the keg during repeated emptying and filling of the same and during shipment and idle storage of keg serves as a plug for closing the tapping opening. In accordance with the presently preferred embodiment of the invention the seal member 16 is assembled with and carried by the tavern unit. The construction and arrangement of the seal member 16 and the manner in which it cooperates with the tavern and keg units when the two units are connected assures a high degree of sealing integrity therebetween.

In the drawing, the keg unit 12 is shown in the tapping opening of a keg 18 of the so-called "golden gate" type which has a tapping opening 20 defined by a cylindrical sleeve 22 internally threaded to receive a cylindrical nut such as indicated at 24 which retains the keg unit in assembly with the keg. The illustrated keg unit 12 has a cylindrical body 26 which includes a base portion 28 and a stem portion 30. An annular flange 31 encircles the base portion 28 to provide seating surfaces for an annular seal 32, which provides a gas and liquid tight seal between the keg 18 and the keg unit 12, and for the cylindrical nut 24, which surrounds the base portion 28 and bears upon the flange 31 to secure the keg unit 12 in assembly with the keg 18. A pin 34 projects radially outwardly from the flange 31 and is received in a slot in the sleeve 22 to retain the keg unit 12 in a predetermined position of orientation relative to the keg 18. When the keg unit 12 is properly mounted in the tapping opening 20, the upper end of the stem 28 which is externally threaded projects outwardly beyond the sleeve 22. The upper end of the stem 28 has a generally cylindrical outwardly opening recess 36 formed therein as best shown in FIG. 3. The bottom of the recess 36 is partially defined by a generally circular bearing surface 38 which faces in an axially outward direction. An annular groove 40 formed in the stem surrounds the bearing surface of 38 and includes an abutment surface 42 which faces in an axially outward direction and further defines the bottom of the recess 36.

The keg unit 12 is provided with two side-by-side passageways 44 and 46 which open through the bearing surface 38 and pass through the body 26 for communicating with the interior of the keg 18 to permit passage of beer or other liquid from the keg and passage of air or other pressurized gas into the keg. The passageway 44 includes a smooth generally cylindrical bore 48 which passes through the stem and opens outwardly through the bearing surface 38. It also includes another bore 50 which opens through the lower surface of the base portion 28. The passageway 46 similarly includes a smooth cylindrical bore 52 of somewhat smaller diameter than the bore 48 which also passes through the stem 26 and opens through the bearing surface 38. The passageway 46 also includes another bore 54 which communicates with the bore 52 and which opens through the lower surface of the base portion 28, as shown in FIG. 1.

Fluid flow through the passageways 44 and 46 is controlled by two valve elements 56 and 58 located respectively in valve chambers defined by the bores 50 and 54. Each of the valve elements 56 and 58 has a mushroom shape and includes a spherical surface engagable with an associated valve seat formed at the upper end of the chamber in which it is received. Each valve element is biased upwardly toward a closed position relative to its valve seat by an associated helical compression spring 60 or 62. The upper end of each spring surrounds the stem of the associated valve element. The lower end of the spring 60 is received in the bore of a tubular fitting 64 which is threadably connected with the base portion 28 at the lower end of the bore 50. The spring 62 is similarly received and retained by another fitting 66 threadably received in the bore 54.

When the tavern unit 14 is connected with the keg unit 12, as shown in FIG. 1, the valve elements 56 and 58 are each held in open position by means hereinafter described. It will, however, be understood that when the tavern unit is disconnected from the keg unit the springs 60 and 62 hold the valve elements 56 and 58 in tight sealing engagement with their respective valve seats to prevent passage of gas or liquid from the keg to the passageways 44 and 46. Before leaving the description of the keg unit 12 it should be noted that air or other gas is introduced into the interior of the keg 14 through the passageway 46 and for this reason the bore fitting 66 communicates directly with the upper portion of the space enclosed by the keg. Beer or other liquid is withdrawn from the keg through the passageway 44. Accordingly, the fitting 64 includes a stem which receives the upper end of a flexible hose or tube 68, preferably made of nylon or other plastic material. When the keg unit 12 is properly secured to the keg 18 the tube 68 extends to the bottom of the keg for conducting beer or other fluid upwardly to the keg unit.

Referring now to the tavern unit 14, this unit comprises a generally cylindrical body 70 which has an enlarged lower end portion. At its lower end, the body 70 has a generally circular bearing surface 72 surrounded by an annular wall 74 which extends downwardly therefrom in an axial direction when the tavern unit 14 is connected to the keg unit 12, as best shown in FIG. 3. The annular wall 74 is adapted to be received in the groove 40 and has an abutment surface 75 adapted to engage the abutment surface 42. Thus, the coengagable abutment surfaces 42 and 75 cooperate in engagement to provide means for maintaining a minimum predetermined distance between the bearing surface 38 on the keg unit and the opposing bearing surface 72 on the tavern unit when the two units are connected. The body 70 also has two passageways 76 and 78 which pass therethrough and open through the bearing surface 72 for communicating respectively with the two passageways 44 and 46 in the keg unit when the two units are connected. The passageway 76 is defined by a cylindrical bore parallel to and offset from the central axis of the body 70 and has an enlarged diameter portion 80 in the lower end of the body and a smaller diameter portion 82 at the upper end of the body. The bore portion 82 does not pass completely through the upper end of the body 70 and at its upper end communicates with a short bore 84 coaxial with the axis of the body 70. The passageway 78 opens through the lower end of the body and includes an enlarged diameter portion 86 and above such portion a smaller diameter portion 88. At its upper end the bore portion 88 communicates with an opening 90 passing through the wall of a short tube 92 arranged perpendicular to the axis of the body 70 with one end inserted into a short transverse opening formed in the body 70. The tube 92 is press fitted, welded or otherwise securely fixed to the body of the tavern unit 14.

Communication between the passageways in the tavern unit and the passageways in the keg unit is provided by a pair of generally cylindrical tubular probes 92 and 94. The probe 92 has its upper end portion inserted into the enlarged diameter bore portion 80 of the passageway 76. In a similar manner the probe 94 has its upper end portion inserted into the enlarged diameter bore portion 88 of the passageway 78. Two probes are press fitted or otherwise suitably secured in fixed position in the body 70.

The outside diameter of the probes 92 and 94 are so related to the inside diameters of the bores 48 and 52, respectively, that the probes will fit into the latter bores in the keg unit 12 with little or no looseness and may be readily slid longitudinally of the bores 48 and 52 with little or no manual force. Due to the difference in the diameters of the two probes and of the two bores in the keg unit which receive the same, it is impossible to improperly connect the tavern unit to the keg unit. When the tavern unit is in its connected position relative to the keg unit, the probe 92 and 94 form part of the flow paths for beer and air out of and into the keg as will be evident from FIG. 1. The probes 92 and 94 are of such a length that when the tavern unit 14 is in its connected position relative to the keg unit 12 the lower end of each probe engages in associative valve element 56 or 58 to retain the valve element in an unsealed or open position.

To move the tavern unit 14 to and releasably retain it in its connected position relative to the keg unit 14, the body 70 of the tavern unit at its lower end includes a radially outwardly extending flange 96 which provides a radial shoulder for supporting a union nut 98 internally threaded to engage the external threads on the upper end of the stem 28, as best shown in FIG. 1. The periphery of the nut 98 is preferably fluted or grooved as best shown in FIG. 2 to facilitate manual rotation in connecting or disconnecting the tavern unit 14.

In accordance with the invention, the elastomeric seal member 16 which, as shown, is carried by the tavern unit 14 provides a liquid and gas tight seal between the two units when the tavern unit is in its connected position. Referring now particularly to FIGS. 2–6 the seal member 16 is preferably made from rubber and comprises a pair of generally annular portions 100 and 102 integrally connected in adjacent overlapping relation throughout a connecting region indicated by the double headed arrow 104 (FIG. 4) to form a generally figure eight shaped configuration. A generally cylindrical aperture 108 formed in the annular portion 102 is adapted to receive the probe 94 therethrough. The cross-sectional configuration of the seal member is preferably generally rounded or somewhat eliptical. However, in the illustrated seal 16, each of the generally annular portions 100 and 102 has a generally rectangular cross-section rounded at its corners, as best shown in FIGS. 5 and 6. The inside diameters 106 and 108 are preferably not greater than the respective outside diameters of the probes 92 and 94. However, the center distance between the two apertures is substantially equal to the center distance between the two probes. As viewed in FIG. 4, the seal member 16 has a bilateral axis of symmetry, designated by the numeral 110, which intersects the axis of the probes 92 and 94 to divide each of the annular portions 100 and 102 into two symmetrical portions, the symmetrical portions which comprise the annular portion 100 being designated 100a and 100b. The symmetrical portions which define the remainder of the seal member or the seal portion 102 are designated 102a and 102b. The two connected generally annular portions which comprise the seal 16 preferably each have an oval or generally ellipsoidal peripheral configuration and a major axis which extends transversely of the axis of symmetry. In the illustrated case, the seal portion 100 has a major axis designated 100m which extends transversely of the axis of symmetry 110 and intersects the axis of the probe 92 When the seal member is assembled with the tavern unit 14. In like manner, the major axis of the seal portion 102 is designated 102m, extends transversely of the axis of symmetry 110, and intersects the axis of the probe 94. Each symmetrical portion of the seal member 16 has a periphery at least partially defined by a radius of curvature having its center disposed on an associated major axis and spaced transversely from the axis of symmetry 10 in the direction of the symmetrical portion. Thus, for example, the symmetrical portion 100a disposed above the axis of symmetry 110, as viewed in FIG. 4, has a radius of curvature designated at $R_1$ which has its center disposed above the axis of symmetry 110 substantially as shown. The symmetrical portion 102a has a radius of curvature $R_2$ and a center of curvature disposed on the axis 102m above the axis of symmetry 110, substantially as shown. The length of the seal member 106 measured along its axis of symmetry 110 is approximately equal to the inside diameter of the recess 71 in the tavern unit with which it is assembled. It will be noted that since the centers of curvature which define portions of the periphery of the seal member 16 are off-set from the axis of symmetry 110 the seal member is slightly prolated or flattened at opposite ends of the axis of symmetry. The radii of curvature used to develop the peripheral configurations of the seal member will, of course, be determined by the diameters of the associated probes. However, the radii are chosen to intersect each other to define the connecting region 104 which extends transversely in opposite directions from the axis of symmetry substantially as shown. In the illustrated case the radius of curvature $R_1$ is greater than the radius but less than the diameter of the aperture 106. A similar relationship exists between the radius of curvature $R_2$ and the radius and diameter of the aperture 108.

As previously noted, the seal member 16 is assembled with the tavern unit 14 and at least partially disposed within the recess 71 therein. The slightly prolated end portions of the seal member will, of course, be slightly deformed to conform to the annular contour of the annular wall 74 in the areas of engagement therewith as best shown in FIG. 2. The seal member 16 has a thickness measured in an axial direction which is greater than the minimum predetermined distance between the sealing surfaces 72 and 38, the later minimum distance being determined when the abutment surface 75 on the annular wall 74 is in abutting engagement with the stop or abutment surface 42 on the keg unit 12. The thickness of the seal member 16 is preferably not greater than the depth of the recess 71, so that the seal member is preferably disposed within the recess before the tavern unit is moved into connecting position relative to the keg unit. This arrangement allows the annular wall 36 to enter the recess 40 before compressive force is applied to the seal member by movement of the bearing surface 72 toward the bearing surface 38 when the nut 98 is tightened to move the tavern unit 14 into connected relationship with the keg unit 12. Thus, the possibility of seal material being extruded radially outwardly from the recess 71 and into the groove 40 is eliminated. Due to the particular configuration of the seal member 16 in the manner in which it cooperates with the tavern unit 14 and the keg unit 12, the seal material is slightly displaced within the recess when the two units are moved into connected relation to provide gas and liquid tight sealing engagement between the probes 92 and 94 and the bearing surfaces 38 and 72. It should be noted that when the tavern unit 14 is connected to the keg unit 12, as shown in FIGS. 1 and 3, the seal member 16 is generally supported on four sides throughout its connecting region 104. More specifically, in the region 104 the seal material engages the walls of the two probes 92 and 94 and the bearing surfaces 38 and 72. The opposite ends of the seal member 16 are also supported or contained in a like manner by portions of four associated walls. Thus, as viewed in FIG. 4, the left end of the annular portion 100 engages an associated portion of the inner surface of the annular wall 74, an associated portion of the wall of the probe 92 and the bearing surfaces 38 and 72. The right end of the annular portion 102 is similarly contained by associated portions of the probe 94, the annular wall 74 and the two bearing surfaces 38 and 72. The remaining regions of the seal are free to be displaced radially outwardly relative to the probes when the tavern unit is connected to the keg unit and for this reason additional seal material is provided in the latter regions to assure sealing integrity. Thus, in the illustrated embodiment 10, the seal 16 is displaced from its broken line position to its solid line position in FIG. 2, when the tavern unit 14 is connected to the keg unit 12. The cooperative relationship between the coengageable abutment surfaces 42 and 75 which controls the predetermined minimal distance between the bearing surfaces 38 and 72 prevents the seal member 16 from being crushed, extruded or otherwise taking a permanent set. Thus, the tavern unit may be repeatedly connected to or disconnected from other keg units without impairing the sealing capability of the seal member 16.

The keg unit 12 and the tavern unit 14 hereinbefore described are similar in many respects to corresponding units disclosed in my U.S. Pat. No. 3,228,413, entitled Keg Tapping Device, issued Jan. 11, 1966. Reference may be had to the aforementioned patent for a more complete disclosure of the manner in which the two units cooperate in assembly to facilitate efficient liquid transfer. While the combination of the present invention has been illustrated and described with reference to a tapping device particularly adapted for use with a "golden gate" keg system, it will be evident from the disclosure in my aforementioned patent application that the tapping device of the present invention may be adapted for use with kegs of other types and such modified embodiments are contemplated within the scope of the invention.

I claim:

1. In a keg tapping device the combination comprising a first unit adapted to be mounted in the tapping opening of a keg and having a first bearing surface exposed externally of the keg and two side-by-side passageways passing therethrough and opening through said first bearing surface for communicating with the interior of the keg, a second unit movable between connected and disconnected positions relative to said first unit and having a second bearing surface thereon and two passageways passing therethrough and arranged to communicate respectively with the two passageways in the first unit when the second unit is in its connected position relative to said first unit, said second unit having a pair of generally cylindrical tubular probes projecting in parallel side-by-side relation from said second bearing surface, each of said probes communicating with an associated one of said passageways in said second unit and being insertable into and axially slidable relative to an associated one of said passageways in said first unit as said second unit is moved into its connected position relative to said first unit, said first and second bearing surface being disposed in parallel relation to each other when said second unit is in its connected position relative to said first unit, means for maintaining a minimum predetermined distance between said first and second bearing surface when said second unit is in its connected position relative to said first unit, a unitary elastomeric seal member assembled with said second unit in bearing engagement with said second bearing surface and including a pair of generally annular portions integrally connected in adjacent relation to form a generally figure-eight shaped configuration, each of said generally annular portions having a generally cylindrical aperture receiving an associated one of said probes therethrough, said seal member having an axis of symmetry intersecting the axes of said probes and dividing each of said annular portions into two symmetrical portions, each of said generally annular portions having a generally ellipsoidal peripheral configuration and a major axis extending transversely of said axis of symmetry, said sealing member in assembly with said second unit and before said second unit is moved into said connected position having an axial thickness greater than said minimum predetermined distance, said sealing member in said connected position being in sealing engagement with said first and said second bearing surface, and means for moving said second unit to and retaining it in said connected position.

2. The combination defined in claim 1 wherein said annular portions are connected together throughout a region extending transversely outwardly in opposite directions from said axis of symmetry.

3. The combination as set forth in claim 2 wherein the periphery of each said symmetrical portion is partially defined by a radius of curvature having its center disposed on a line intersecting the axis of an associated probe and generally normal to said axis of symmetry, said center being spaced transversely from said axis of symmetry and in the direction of said symmetrical portion.

4. The combination as set forth in claim 3 wherein said radius of curvature of said symmetrical portion is less than the diameter of said aperture associated with said annular portion which includes said symmetrical portion.

5. The combination as set forth in claim 2 wherein said second unit includes an integral annular wall surrounding said second bearing surface and extending in an axial direction therefrom, said annular wall and said second bearing surface cooperating to define a generally cylindrical axially outwardly opening recess, said seal member being at least partially disposed in said recess.

6. The combination as set forth in claim 5 wherein said first bearing surface is generally circular and has a diameter substantially equal to the diameter of said cylindrical recess, said first bearing surface being disposed within said recess when said second unit is in said connected position relative to said first unit.

7. The combination defined in claim 5 wherein the length of said seal member measured along said axis of symmetry is substantially equal to the diameter of said cylindrical recess.

8. In a keg tapping device the combination comprising a first unit adapted to be mounted in the tapping opening of a keg and having a generally circular first bearing surface exposed externally of the keg and two side-by-side passageways passing therethrough and opening through said first bearing surface for communicating with the interior of the keg, a second unit movable between connected and disconnected positions relative to said first unit and having a second bearing surface thereon and two passageways passing therethrough and arranged to communicate respectively with the two passageways in the first unit when the second unit is in its connected position relative to said first unit, said second unit having an integral annular wall surrounding said second bearing surface and extending outwardly therefrom in an axial direction, said annular wall and said bearing surface cooperating to define a generally cylindrical axially outwardly opening recess having a diameter substantially equal to the diameter of said first bearing surface, said second unit having a pair of generally cylindrical tubular probes projecting in parallel side-by-side relation from the said second bearing surface, each of said probes communicating with an associated one of said passageways in said second unit and being insertably into and axially slidable relative to an associated one of said passageways in said first unit as said second unit is moved into its connected position relative to said first unit, said first and second bearing surface being disposed in parallel relation to each other when said second unit is in its connected position relative to said first unit, abutment means on one of the units, stop means on the other of said units for engaging said abutment means to maintain a minimum predetermined distance between said first and second bearing surface when said second unit is in its connected position relative to said first unit, a unitary elastomeric seal member assembled with said second unit in bearing engagement with said second bearing surface and at least partially disposed within said cylindrical recess, said seal member including a pair of generally ellipsoidal portions integrally connected in adjacent relation throughout a connecting region to form a generally figure-eight shaped configuration, each of said ellipsoidal portions having a generally cylindrical aperture receiving an associated one of said probes therethrough, said seal member having an axis of bilateral symmetry intersecting the axes of said probes and dividing each of said ellipsoidal portions into two symmetrical portions, each of said ellipsoidal portions having its major axis extending transversely of said axis of symmetry and intersecting the axis of an associated one of said probes, each of said symmetrical portions having a periphery partially defined by a radius of curvature having its center on an associated said major axis and transversely spaced from said axis of symmetry and in the direction of said symmetrical portion, said connecting region extending transversely outwardly in opposite directions from said axis of bilateral symmetry, said seal member having a length measured along said axis of bilateral symmetry substantially equal to the diameter of said cylindrical recess, said sealing member in assembly with said second unit and before said second unit is moved into its connected position having an axial thickness greater than said minimum predetermined distance, said sealing member in said connected position being in sealing engagement with said first and second bearing surface, said first bearing surface in said connecting position being disposed within said cylindrical recess and means for moving said second unit to and retaining it in said connected position.

* * * * *